United States Patent [19]

Sears et al.

[11] 4,002,457

[45] Jan. 11, 1977

[54] SOIL CONDITIONERS AND FERTILIZERS FROM SPENT SULFITE LIQUOR

[75] Inventors: Karl David Sears; Franklin Willard Herrick, both of Shelton, Wash.

[73] Assignee: International Telephone and Telegraph Corporation, New York, N.Y.

[22] Filed: Mar. 11, 1976

[21] Appl. No.: 666,399

Related U.S. Application Data

[63] Continuation of Ser. No. 498,753, Aug. 19, 1974, abandoned.

[52] U.S. Cl. .................... 71/25; 71/64 SC; 162/16; 201/2.5
[51] Int. Cl.² ................................ C05F 7/02
[58] Field of Search ............. 71/1, 25, 26, 43, 44, 71/54, 63, 64 E, 64 F, 64 SC; 162/16, 36; 201/2.5, 25

[56] References Cited

UNITED STATES PATENTS

| | | | |
|---|---|---|---|
| 1,976,905 | 10/1934 | Thordarson | 71/25 X |
| 2,935,504 | 5/1960 | King et al. | 71/64 SC |
| 3,168,433 | 2/1965 | Ferrigan, Jr. et al. | 162/36 X |
| 3,325,275 | 6/1967 | Bratzler et al. | 162/16 X |
| 3,579,321 | 5/1971 | Stoller | 71/25 |
| 3,595,742 | 7/1971 | Hess et al. | 162/36 X |
| 3,718,446 | 2/1973 | Brink et al. | 201/2.5 X |
| 3,794,718 | 2/1974 | Lahtvee et al. | 162/36 X |
| 3,841,974 | 10/1974 | Osborne | 201/2.5 |

FOREIGN PATENTS OR APPLICATIONS

| | | | |
|---|---|---|---|
| 561,487 | 10/1932 | Germany | 71/25 |

OTHER PUBLICATIONS

Kobe et al., Ammoniation of Sulfite Waste Liquor, May 1936, Ind. and Eng. Chem., vol. 28, No. 5, pp. 571–572.

*Primary Examiner*—Charles N. Hart
*Assistant Examiner*—Robert H. Spitzer
*Attorney, Agent, or Firm*—J. B. Raden; H. J. Holt

[57] ABSTRACT

Spent sulfite liquor is converted into a nitrogen containing water insoluble product useful as a soil conditioner and fertilizer. The spent sulfite liquor is heated at a temperature of 170° to 260° C to form a partially pyrolyzed water insoluble material and the water insoluble material is then reacted with ammonia at a temperature of 170° to 260° C.

10 Claims, No Drawings

SOIL CONDITIONERS AND FERTILIZERS FROM SPENT SULFITE LIQUOR

This is a continuation, of application Ser. No. 498,753 filed Aug. 19, 1974, now abandoned.

This invention relates to nitrogen containing, water insoluble products prepared from spent sulfite liquor and to a process for their preparation.

Many attempts have been made to convert spent sulfite liquor, essentially a waste by-product from the preparation of wood pulp by the sulfite process, into useful products. Many of these attempts have involved investigations of the utility of these materials as soil additives to improve plant growth. The investigations have included pressure ammoniation of spent sulfite liquor at elevated temperature to give products with up to about 10% nitrogen. A second route that has been investigated is the heating of spent sulfite liquor with an alkaline substance such as calcium hydroxide to produce a soluble desulfonated lignin which is then ammoniated to obtain products containing 8 to 10% nitrogen which are utilizable as a fertilizer. However, none of these products has proved commercially useful, either for reasons of cost or because of property deficiencies in the product.

It is an object of the present invention to provide a nitrogen containing, water insoluble product from spent sulfite liquors which is useful as both a soil conditioner and a fertilizer.

It is an additional object of this invention to provide an economical process for converting spent sulfite liquor into a useful product.

The foregoing and other objects of the invention are achieved by heating spent sulfite liquor at a temperature of 170° to 260° C to form a partially pyrolyzed water insoluble material and reacting said water insoluble material with ammonia at a temperature of 170° to 260° C. The products of the invention have been found to be useful both as soil conditioners and as slow release fertilizers.

"Spent sulfite liquor" (SSL) as used herein refers to spent sulfite liquor derived from the pulping of wood with a solution containing sulfurous acid and sodium or ammonium bisulfite. Such spent sulfite liquors have a relatively low pH (e.g., 1.5 to 4.0) and the lignin contained therein is considered to be in the form of lignosulfonic acids and lignosulfonic acid salts of ammonium or sodium. Such liquors also contain large quantities of reducing sugars, predominantly mannose and glucose, derived through hydrolysis of the carbohydrate fraction of the wood by the acidic cooking liquor. The spent sulfite liquors also include ammonium and sodium-base spent sulfite liquors which were originally obtained by the acid-sulfite pulping of wood with sulfurous acid - bisulfite solutions of other bases but which were subsequently converted to ammonium - or sodium-base. Examples of the latter include ammonium - and sodium-base spent sulfite liquors prepared from calcium-base spent sulfite liquor by (1) treatment with ammonium or sodium sulfate or sulfite under pH conditions such that the calcium is substantially precipitated, or (2) cation exchange. The process is carried out by first heating the SSL to form a partially pyrolyzed water insoluble material. The semi-pyrolysis reaction is carried out at temperatures ranging from 170° to 260° C in the open atmosphere with appropriate venting for times as little as ½ hours to as long as 12 hours. Preferred operating conditions are temperatures from 220° to 240° C and reaction times for from 1 to 6 hours. The semi-pyrolyzation produces a reaction product which is from 75 to 97% water insoluble. The water soluble portion may be leached away with water prior to the second step of the process.

The insolubilized SSL resulting from the partial pyrolyzation is then reacted with ammonia at temperatures ranging from 170° to 260° C for from 0.25 to 6 hours. Reactions at 215° to 235° C gave the highest organically combined nitrogen levels — from 6.3 to 9.1% for the product prepared from insolubilized ammonia-base SSL and from 3.2 to 6.5% for the sodium-base counterpart. The reaction is carried out using weight ratios of ammonia to SSL solids of 0.25–2.0:1.0 (0.25 to 2 parts ammonia for each one part of SSL solids). Highest nitrogen contents in the final product occur at ratios of 1.0–1.5:1, with a preferred ratio being 1.1:1. There is normally excess ammonia present in the ammoniated product, and thus an excess of ammonia is desirable to force as much nitrogen as possible into the product by the mass action effect. The reaction may be carried out using either ammonia gas or a concentrated solution of ammonium hydroxide. The reaction with ammonia gas is somewhat more efficient than ammoniation with ammonium hydroxide solution. Times of reaction lower than 0.25 hours do not produce sufficient nitrogen incorporation while times in excess of 6 hours increase nitrogen content only slightly.

The foregoing reaction conditions are applicable to insolubilized SSL prepared from both ammonia- and sodium-base SSL. Somewhat higher organically combined nitrogen levels are obtained with ammonia-base SSL, undoubtedly because of the presence of some organically combined nitrogen in the insolubilized ammonia-base SSL product before the ammoniation reaction.

The ammoniated insolubilized products of the invention are useful both as soil conditioners and as slow release fertilizers. Experiments with tomato plants at additive levels of 1 to 10% of soil weight in diverse soil types have indicated substantially increased fruit and tissue yields. The increased growth promotion is believed due principally to a soil conditioning effect although the increased nitrogen availability contributes to the promotion of growth.

The invention will be better understood in connection with the following examples in which all parts and percentages are by weight, unless otherwise indicated.

EXAMPLES 1 to 18

A 55 gallon drum of ammonia-base SSL was concentrated to a total solids content of 57% having a viscosity of 6.4 poises. The concentrated SSL had the following analyses:

| | |
|---|---|
| Nitrogen (total) | 2.4% |
| Sulfur (total) | 6.7% |
| Sulfite (as S) | .4% |
| Sulfate (as S) | 0.8% |
| Free sugars (total) | 28.0% |
| Total sugars (after hydrolysis | 33.2% |
| Ammonium lignosulfonate | 67.0% |

The concentrated SSL (60.0g, 34.2 g. oven dried) was placed in each of three shallow aluminum pans. The pans were placed in an oven preheated at 170° C. Initially there was some foaming and frothing that could be controlled by puncturing the foam surface. At 6, 12 and 24 hours intervals, a pan was removed and cooled. Insolubilized SSL products were also made by open atmospheric heating at 200°C and 230°C under identical conditions.

Analyses of the insolubilized products of each of the heating experiments are set forth in Tables I, II and III for each of the temperatures used. Solubilities were determined by stirring 1.0 gram of the product in 100 ml of water for 1 hour and then filtering and drying.

TABLE I

170° C

| Example | Heating Condition | Time at Temp. Hr. | Wt. Loss on Heating, % | Sol % | %N,S of Product | %S Loss* |
|---|---|---|---|---|---|---|
| 1 | Open | 6 | 6 | 20 | 2.5,5.3 | 26 |
| 2 | " | 12 | 15 | 13 | 2.5,5.2 | 33 |
| 3 | " | 24 | 14 | 10 | 2.6,5.0 | 36 |

*Corrected for weight shrinkage during heating.

TABLE II

200° C

| Example | Heating Condition | Time at Temp. Hr. | Wt. Loss on Heating, % | Sol % | %N,S of Product | %S Loss* |
|---|---|---|---|---|---|---|
| 4 | Open | 6 | 13 | 10 | 2.6,4.7 | 39 |
| 5 | " | 12 | 18 | 5 | 2.7,4.0 | 51 |
| 6 | " | 24 | 19 | 5 | 2.9,3.5 | 58 |

*Corrected for weight shrinkage during heating.

TABLE III

230° C

| Example | Heating Condition | Time at Temp. Hr. | Wt. Loss on Heating, % | Sol % | %N,S of Product | %S Loss* |
|---|---|---|---|---|---|---|
| 7 | Open | 6 | 21 | 5 | 2.8,3.5 | 59 |
| 8 | " | 12 | 25 | 6 | 2.8,3.1 | 65 |
| 9 | " | 24 | 29 | 3 | 3.0,3.7 | 61 |

*Corrected for weight shrinkage during heating.

It may be seen from Tables I to III that weight loss increased and water solubility decreased with the use of increasingly more drastic conditions. The bulk of the weight loss is due to loss of carbohydrate material. Analysis of the Example 8 product (230° C for 12 hours) showed complete absence of sugars. The heating process also serves to demethoxylate and desulfonate the SSL. The sulfur content is seen to become successively lower as temperature is increased. The % loss of sulfur by weight is seen to be as high as 65% for Example 8.

EXAMPLES 10 to 17

Insolubilized ammonia-base SSL prepared as set forth in Example 9 was placed in a stainless steel vessel and concentrated $NH_4OH$ was added (125 ml, 32.2 g $NH_3$). The vessel was sealed and placed in an oven maintained at 230° C. The sealed vessel was removed and cooled at time intervals of from 0.25 to 6 hours. Insoluble product was removed by filtration. The insoluble product was then dispersed in 500 ml. of water and stirred for 1.5 hours before removal by filtration and thorough rinsing. The filtrates were discarded. The solid was dried in a vacuum oven at 50° C overnight. The same reaction was repeated at various times intervals at 200° C and at 260° C. Analyses were obtained of each of the reaction products and these are set forth in Table IV.

TABLE IV

| | | | Solid Product[a] | | | |
|---|---|---|---|---|---|---|
| Example | Temp., °C | Time, hr. | Wt. %[b] | % N | % N as $NH_3$ | % N Org. Comb. |
| 10 | 230 | 6 | 72 | 9.4 | 0.3 | 9.1 |
| 11 | 230 | 3 | 75 | 8.4 | 0.5 | 7.9 |
| 12 | 230 | 1 | 78 | 7.8 | 0.7 | 7.1 |
| 13 | 230 | 0.5 | 80 | 7.7 | 0.8 | 6.9 |
| 14 | 230 | 0.25 | 77 | 6.6 | 0.3 | 6.3 |
| 15 | 200 | 3 | 80 | 7.3 | 1.0 | 6.3 |
| 16 | 200 | 1 | 84 | 7.5 | 0.7 | 6.8 |
| 17 | 260 | 0[c] | 72 | 7.6 | 0.3 | 7.3 |

[a]Water insoluble.
[b]Based on weight of starting material (30 g.).
[c]As soon as 260° C was reached, solution was cooled; time to temperature: 1.17 hour.

Table IV shows that the amount of organically combined nitrogen generally decreased with decreased reaction times, although the reaction product obtained by just heating to 260° C gave quite a substantial combined nitrogen level — 7.3%. On the other hand, yields of reaction product increased with decreasing time and thus short reaction times are desirable from a yield standpoint. All factors considered, reactions at about 225° to 235° C for relatively short times of from ¼ to 1 hour would be the optimum time and temperature to prepare a high organically combined product (about 7.0% organically combined nitrogen).

EXAMPLES 18 to 24

Additional reactions were carried out to determine the effect of ammonia concentration on yield and nitrogen incorporation. Examples 18 to 24 were repeated except that the ratio of ammonia concentration to SSL solids was varied. The reactions were carried out at 200° and 230° C for 0.5 hours. Table V shows the analyses of these reaction products.

TABLE V

| Example | Temp. °C | NH₃ Conc., g. | Wt. Ratio of NH₃:SSL solids | Solid Product | | | |
|---|---|---|---|---|---|---|---|
| | | | | Wt., % | % N | % N as NH₃ | % N Org. Comb. |
| 18 | 230 | 32.6 | 1.09:1.00 | 80 | 7.7 | 0.8 | 6.9 |
| 19 | 230 | 16.3 | 0.54:1.00 | 83 | 6.5 | 0.2 | 6.3 |
| 20 | 230 | 10.9 | 0.36:1.00 | 88 | 6.0 | 0.3 | 5.7 |
| 21 | 230 | 8.2 | 0.27:1.00 | 88 | 6.2 | 0.4 | 5.8 |
| 22 | 200 | 16.1 | 0.54:1.00 | 87 | 5.6 | 0.5 | 5.1 |
| 23 | 200 | 10.7 | 0.36:1.00 | 86 | 5.6 | 0.5 | 5.1 |
| 24 | 200 | 8.0 | 0.27:1.00 | 87 | 5.4 | 0.5 | 4.9 |

Table V shows that at the lower ratios — Examples 19 through 24 — the amount of organically combined nitrogen does not significantly vary. However, at levels above a ratio of about 1:1, a substantially higher combined nitrogen level occurred, principally because of the mass action effect. Thus, best results are achieved with an excess of ammonia.

EXAMPLE 25

The example illustrates the preparation of gas ammoniated insolubilized ammonia-base SSL material.

Insolubilized ammonia-base material was prepared by heating concentrated ammonia-base SSL (110 g., 550 g. o.d.) in a large metal pan for 6 hours at 230° C. Initially there was frothing that could be controlled by puncturing the foam surface. After 6 hours, the pan was removed and cooled. The product weighed 405 g. The insolubilized SSL product was reduced to a more uniform particle size in a Waring Blendor.

The insolubilized product (200 g.) was placed in a stainless steel rocking autoclave that was sealed. Ammonia(93.5 g.), obtained from a large cylinder as liquid ammonia, was added to the autoclave (ratio of NH3: insolubilized SSL product of 0.47:1.00). The unit was heated to 220° C and maintained in the 220° to 230° C range for 1 hour; a pressure of 1750 psi was attained during the reaction. After cooling and venting the excess gases, the solids were removed and placed in the hood and allowed to ventilate further overnight. Weight of product recovered, 214 g. (108% yield). The particle size of the material was further refined in a Waring Blendor.

The reaction product had the following analysis:

| | % |
|---|---|
| Carbon | 59.41 |

| | % |
|---|---|
| Hydrogen | 5.11 |
| Oxygen | 21.76 |
| Nitrogen | 9.31 |
| Nitrogen (as Ammonia) | 1.00 |
| Nitrogen (Organically Bound) | 8.31 |
| Sulfur | 3.66 |
| Solubility (Cold water, 1 g. in 100 ml.) | 15.6 |
| Density (g./cc.) | 0.56 |

These results indicate a higher amount of immediately available nitrogen (as ammonia) and a higher water solubility than is normally obtained by reaction for equivalent times with aqueous ammonium hydroxide. Thus, the gas ammoniated product has more nitrogen in a readily available form for plant growth and would lead, for example, to a more immediate "greening-up" response after application to lawns.

EXAMPLES 26 to 29

Sodium-base SSL was used in these examples. The liquor was concentrated to a total solids content of 50.7% and a viscosity of 2.4 poises. The concentrated sodium-base SSL had the following analyses:

| | |
|---|---|
| Sodium | 4.4% |
| Sulfur (total) | 5.1% |
| Sulfite (as S) | 0.03% |
| Sulfate (as S) | 0.09% |
| Total Sugars (after hydrolysis | 28.5% |
| Sodium Lignosulfonate | 64.0% |

The concentrated sodium-base liquor (59.2 g., 30 g. O.D.) was placed in each of two shallow aluminum pans after adjustment of one of the lignin solutions to pH 1.9 with concentrated sulfuric acid. The pans were allowed to sit one day to allow for some evaporation of moisture so foaming would be prevented during heating. The pans were placed in an oven preheated to 200° C for 12 hours. Initially, there was some foaming and frothing that could be controlled by puncturing the foam surface. After cooling, the remaining solids weighed 18.7 to 20.9 g. for the products derived from the unadjusted and adjusted pH solutions, respectively. The solubilities of these two products was determined by stirring 2.000 g. in 200 ml. of water for 1 hours. The freeze dried filtrates were found to be light cream colored solids. An identical reaction was carried out at 12 hours for 230° C. The results of these reactions are seen in Table VI.

TABLE VI

| Example | pH | Temp. | Wt. Loss on Heating | % Na, % S (total) | | Sol. % | % Na and S in Leached Fraction | |
|---|---|---|---|---|---|---|---|---|
| 26 | 1.9 | 230 | 28 | 6.0 | 5.1 | 22 | 1.5 | 2.1 |
| 27 | 5.1 | 230 | 36 | 6.1 | 5.2 | 21 | 1.8 | 2.0 |
| 28 | 5.1 | 200 | 32 | 5.4 | 4.8 | 22 | — | — |
| 29 | 1.9 | 200 | 24 | 5.3 | 4.7 | 22 | — | — |

EXAMPLES 30 to 36

A series of reactions of insolubilized sodium-base SSL products with ammonia were carried out by the same procedure, varying only time and temperature.

Insolubilized product (30 g.) prepared by open atmospheric heating at 230° C for 12 hours and leached with water to remove the soluble fraction (sodium sulfate) was placed in a stainless steel vessel and concentrated ammonium hydroxide (125 ml., 32.6 g. NH₃) was added. The vessel was sealed and placed in an oven and heated for 3 hours at 230° C. After cooling, the insoluble product was removed by filtration. It was then dispersed in water (500 ml.) and stirred for an additional 1.5 hours before removal by filtration and thorough rinsing. The filtrates were discarded. The solid was dried in a vacuum oven (50° C) overnight. The results at various times and temperature are set forth in Table VII.

TABLE VII

| Example | Temp., °C | Time, hr. | Wt. %[b] | Solid Product[a] | | |
|---|---|---|---|---|---|---|
| | | | | % N | % N as $NH_3$ | % N Org. Comb. |
| 30 | 230 | 6 | 75 | 6.8 | 0.3 | 6.5 |
| 31 | 230 | 3 | 76 | 6.9 | 0.7 | 6.2 |
| 32 | 230 | 1 | 77 | 5.0 | 0.7 | 4.3 |
| 33 | 230 | 0.5 | 75 | 5.2 | 0.7 | 4.5 |
| 34 | 230 | 0.25 | 73 | 4.1 | 0.3 | 3.8 |
| 35 | 200 | 3 | 70 | 3.8 | 0.6 | 3.2 |
| 36 | 260 | 0[c] | 73 | 4.9 | 0.3 | 4.6 |

[a]Water insoluble.
[b]Based on weight of starting material (30 g.).
[c]As soon as 260° C was reached, solution was cooled; time to temperature: 1.17 hours.

Table VII indicates that higher levels of organically combined nitrogen occur when the reaction is carried out at 230° C than at 200° C. The combined nitrogen levels are lower for the product produced from sodium-base SSL than from the ammonium-base SSL. This undoubtedly can be attributed to the fact that about 3% organically combined nitrogen is present in the insolubilized ammonia-base SSL product before ammoniation. Table VII shows that the effect of temperature on yield is only slight. All factors considered, optimum times and temperatures for the ammoniation reaction with sodium-base product are seen to occur at from 3 to 6 hours at about 230° C.

EXAMPLES 37 to 44

The same procedure as Examples 30 to 36 was followed at temperature of 200° to 230° C for 0.5 hours, varying the amounts of ammonium hydroxide. The results are set forth in Table VIII.

TABLE VIII

| Example | Temp. °C | Conc., g | Wt. Ratio of $NH_3$:SSL Solids | Solid Product | | | |
|---|---|---|---|---|---|---|---|
| | | | | Wt. % | % N | % N as $NH_3$ | % N Org. Comb. |
| 37 | 230 | 32.6 | 1.09:1.00 | 75 | 5.2 | 0.7 | 4.5 |
| 38 | 230 | 21.7 | 0.72:1.00 | 74 | 3.9 | 0.3 | 3.6 |
| 39 | 230 | 16.3 | 0.54:1.00 | 74 | 4.0 | 0.3 | 4.1 |
| 40 | 230 | 10.9 | 0.36:1.00 | 72 | 3.3 | 0.3 | 3.0 |
| 41 | 230 | 8.2 | 0.27:1.00 | 73 | 3.1 | 0.4 | 2.7 |
| 42 | 200 | 16.3 | 0.54:1.00 | 71 | 2.8 | 0.4 | 2.4 |
| 43 | 200 | 10.9 | 0.36:1.00 | 71 | 2.6 | 0.4 | 2.2 |
| 44 | 200 | 8.2 | 0.27:1.00 | 71 | 2.3 | 0.4 | 1.9 |

Table VIII indicates (as did Table V) that at the same temperatures, organically combined nitrogen levels do not differ a great deal at varying ammonia ratios below 1:1. However, at levels of about 1.1 to 1, the resulting product (Example 37) had a substantially larger combined nitrogen level than that obtained at ammonia ratios of less than 1:1. The use of an excess of ammonia is therefore preferred, particularly if it is in a form which may be recycled.

Tests were conducted to determine the ability of the products of the invention to promote growth of tomato plants. Experiments were carried out in two diverse soil types. Soils containing 5 and 10% by soil weight of ammoniated insolubilized ammonia-base SSL gave substantially increased fruit and tissue yields; soil containing 10% gave fruit yields of 410 and 250% over the controls and tissue yields of 152 and 184% over the controls. The effect of the additives appears to be the promotion of a more favorable chemical interaction between the soil medium and the plant. Tests have shown that the SSL reaction products of the invention release nitrogen slowly — slower than ureaform fertilizers. Since small amounts of nitrogen were released from the SSL products during the tomato plant tests, it is probable that pH reduction, improvement in soil physical characteristics and general soil conditioning effects were the principal cause of enchanced growth. Increased nitrogen availability played a secondary role.

We claim:

1. A process for preparing a nitrogen containing water insoluble product useful as a soil conditioner comprising the following two sequential steps:
   said first step consisting essentially of heating acidic spent sulfite liquor in the open atmosphere at a temperature of from 170° to 260° C. to form a partially pyrolyzed water insoluble material, and
   said second step consisting essentially of reacting ammonia with said water insoluble material at a temperature of from 170° to 260° C. to produce a water insoluble product containing substantial amounts of organic combined nitrogen.

2. The process of claim 1 in which the spent sulfite liquor is ammonia-base.

3. The process of claim 1 in which the spent sulfite liquor is sodium-base.

4. The process of claim 1 in which the heating step is at a temperature of 220° to 240° C.

5. The process of claim 1 in which the reaction with ammonia is at a temperature of from 215° to 235° C.

6. The process of claim 1 in which the reaction with ammonia is carried out with a ratio by weight of ammonia to water insoluble material of from 0.25 to 2 parts ammonia for each one part of water insoluble material.

7. The process of claim 6 in which an excess of ammonia is used.

8. The process of claim 1 in which the ammonia is in the form of aqueous ammonium hydroxide.

9. The process of claim 1 in which the ammonia is in the form of gaseous ammonia.

10. The product produced in accordance with the process of claim 1.

* * * * *